Figure 1:
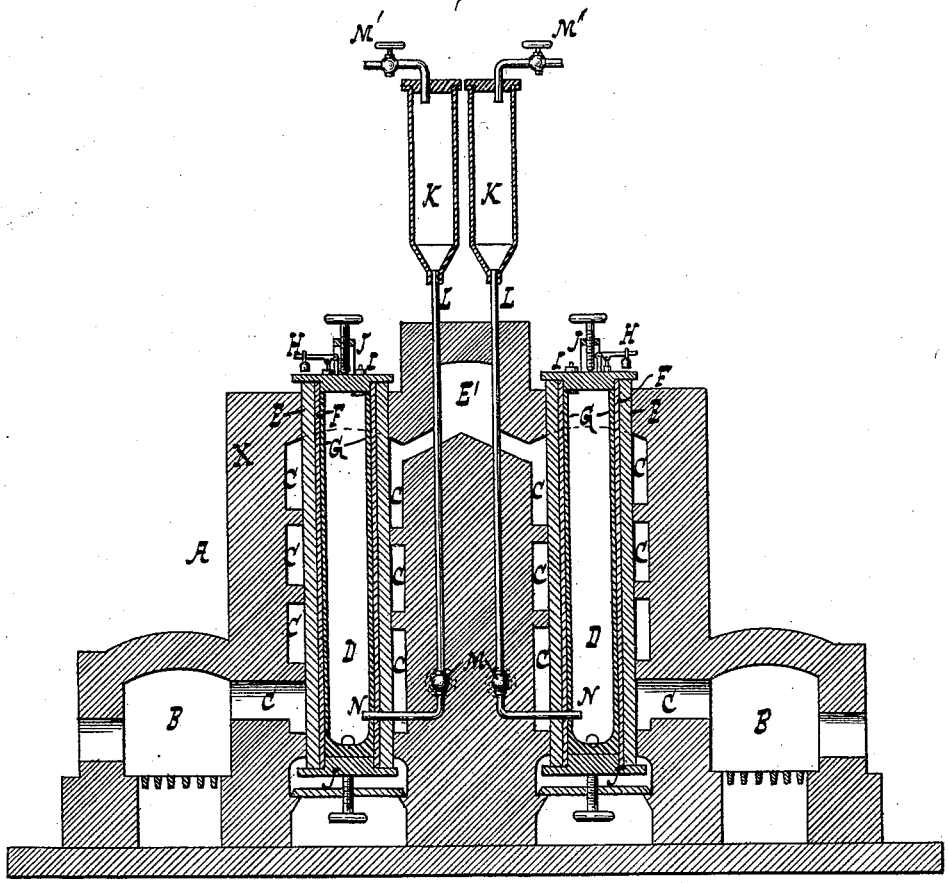

(No Model.) 2 Sheets—Sheet 1.

H. S. BLACKMORE.
PROCESS OF REDUCING METALS.

No. 478,907. Patented July 12, 1892.

WITNESSES:
William Miller
Edward Wolff

INVENTOR:
Henry S. Blackmore.
BY
Van Santvoord & Hauff
ATTORNEYS (No Model.) 2 Sheets—Sheet 2.

H. S. BLACKMORE.
PROCESS OF REDUCING METALS.

No. 478,907. Patented July 12, 1892.

WITNESSES:
Edward Wolff
William Miller

INVENTOR:
Henry S. Blackmore.
BY
Van Santvoord & Hauff
ATTORNEYS.

UNITED STATES PATENT OFFICE.

HENRY S. BLACKMORE, OF MOUNT VERNON, NEW YORK.

PROCESS OF REDUCING METALS.

SPECIFICATION forming part of Letters Patent No. 478,907, dated July 12, 1892.

Application filed June 18, 1891. Serial No. 396,731. (No specimens.)

*To all whom it may concern:*

Be it known that I, HENRY S. BLACKMORE, a citizen of the United States, residing at Mount Vernon, in the county of Westchester and State of New York, have invented new and useful Improvements in Processes for Reducing Metals, of which the following is a specification.

The object of my invention is to reduce metals from their salts or combinations in such a manner that the metal reduced is obtained in a pure state as compared with the results of former processes, not contaminated with foreign materials or substances to an injurious degree, and so that loss by volatilization of either the reducing agent or the material to be reduced will be prevented, thereby not only producing a larger yield of metal, but also economizing the materials and fuel employed.

In all processes hitherto employed for the reduction of metals the almost universal reducing agent has been infusible carbon in some form, except in such cases as the reduction of aluminium, magnesium, and similar metals by means of metallic sodium, the process for which includes the mixing of a salt of aluminium, magnesium, or other compound to be reduced with metallic sodium in small pieces and heating the same in a crucible or reverberatory furnace, when a violent reaction ensues, attended by a series of explosions, which tend to disseminate the reduced metal in small particles throughout the flux and making it almost impossible to cause the same to combine into a button. There has also been a process devised by which the material to be reduced is brought to a fused state and an ingot of metallic sodium forced beneath the fused mass by means of tongs, the same violent action taking place as before; also, a process in which the material to be reduced is brought to a red heat and molten sodium poured upon the same. There are other processes which are dependent upon bringing the reducing agent to a volatile state and passing the same over the material to be reduced, and vice versa, and also bringing the vapors of the two in contact with each other in a chamber provided for the same. There are also other processes by which iron, tungsten, and other metals are reduced from their oxides by means of hydrogen or other gases being passed over them in their heated state.

My process relates especially to the reduction of aluminium, magnesium, sodium, potassium, and similar metals, but is not confined to them, as it may be applied to many other metals.

In carrying out my invention I proceed as hereinafter described, reference being had to the accompanying drawings, in which—

Figure 2:
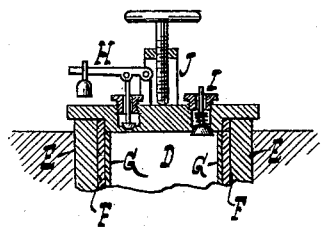
Figure 3:
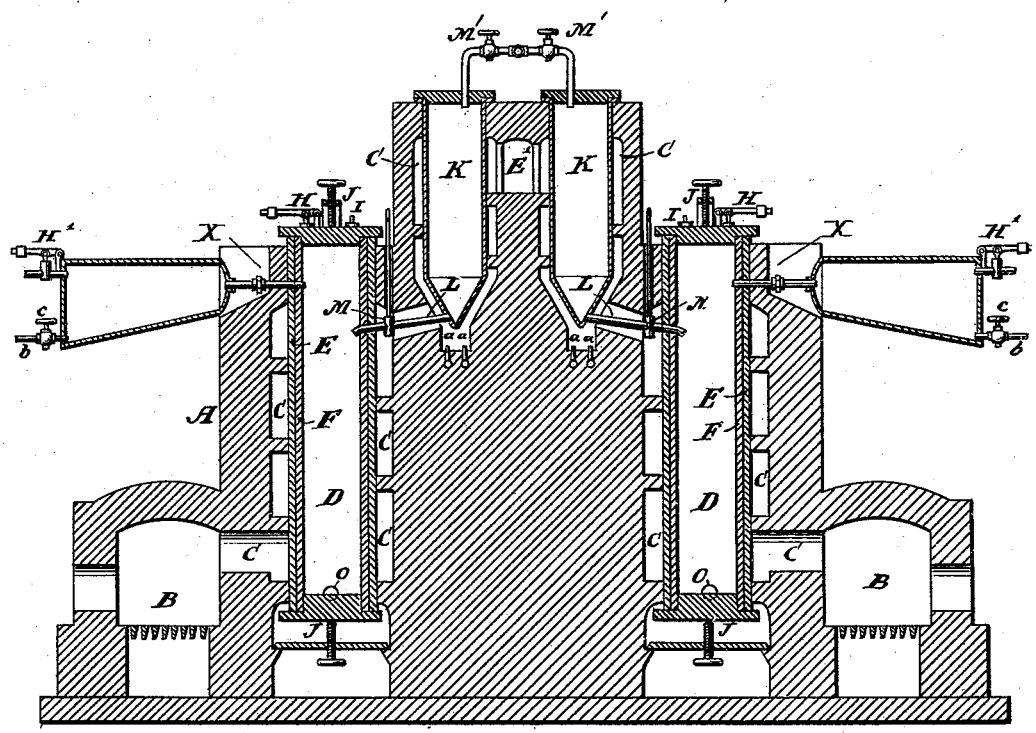

Figure 1 is a vertical section of a furnace by means of which my process can be carried out. Fig. 2 is a vertical section through the head of one of the cylinders or chambers in which the reduction takes place. Fig. 3 is a vertical section of the furnace with modifications adapting it for operation with reducing agents of greater specific gravity than the material to be reduced.

Referring to the drawings, the letter A designates a furnace containing a pair of fire-boxes B B, from each of which proceeds a flue C, that after being carried spirally up and around a cylinder or reducing-chamber D is taken to the chimney E'. The reducing-chambers D are of similar construction with each other, their outer walls E, about which the flues C are carried, being composed, by preference, of fire-clay, within which is a cylinder or vessel F of wrought-iron, which is lined on the inside with a material G specially adapted for the purpose of the process—as, for instance, in the case of aluminium (where care must be taken not to have the aluminium contaminated with silicon, which it would obtain from a fire-clay lining, or with iron, which it would obtain from an iron vessel or receptacle) a carbon lining is employed, and in the case of sodium the ordinary iron cylinder without the extra lining G is preferred.

The cylinders D constitute what I call "reducing-chambers," and as they are duplicates of each other a description of my process in connection with one of them will serve as an example of the process in connection with the other.

The material to be reduced is placed in the reducing-chamber D and fused or brought to a molten state by means of the heated air and products of combustion from the fire-box B, circulating through the flue C. The air in the reducing-chamber D is controlled by an ordinary pressure-valve H and a vacuum-valve I, both placed in the head J of the reducing-chamber. The vacuum-valve I is arranged so that the spring around its stem draws the valve proper upward against its seat to close it, and when the pressure in the chamber D is less than the pressure of the atmosphere the valve will be opened and air will be admitted to equalize the pressure on both sides of the valve.

The reducing agent is fused or melted in a proper vessel K or is placed in that state in such vessel, which is connected by a tube L, controlled by valves or cocks M, with the reducing-chamber D, the tube L entering the reducing-chamber near its bottom at N. When the material to be reduced—say double chloride of aluminium—and the reducing agent—say sodium—are fused or brought to a molten state in their respective chambers or receptacles D and K, pressure is applied to the reducing agent in its vessel K, and the same is forced through the tube L into the reducing-chamber D after the valves or cocks M M have been opened. The valves H and I are so adjusted that when the pressure in the reducing-chamber D exceeds five pounds to the square inch the pressure-valve H opens and the air contained in the reducing-chamber above the molten material therein escapes, while the reducing agent entering the reducing-chamber at N increases the liquid contents of said chamber. As the reducing agent enters the reducing-chamber in a small stream under pressure through the tube L, the reducing agent rises gradually through the fused material to be reduced, quietly reducing it to its metallic state and liberating the small globules of metal contained in it, which, being thus freed from the other matters present, readily combine and settle in a mass or button at the bottom of the reducing-chamber, whence it is finally drawn off through the discharge-opening O and cast into ingots.

It is obvious that in a case where the reducing agent is heavier or of greater specific gravity than the material to be reduced the same should be discharged or forced into the material to be reduced at the top in small streams, instead of at or near the bottom, when a similar result will be obtained by a gradual settling or passage downward of the reducing agent through the fused material in the reducing-chamber.

When reducing agents of comparatively light specific gravity are to be employed—such, for example, as sodium or potassium—it is advantageous to place some aluminium, magnesium, or other metal a salt or compound of which is to be reduced in the bottom of the reducing-chamber D, enough to cover the discharge-opening N, in order to prevent the flux or fused material in the reducing-chamber from clogging the mouth of the tube L at N.

Where aluminium is to be reduced, a compound—such as cryolite or double chloride of aluminium and sodium or a similar compound—is fused or melted in the reducing-chamber D and sodium or some similar reducing agent is melted in a chamber or vessel K, of iron, in any convenient manner by the heat generated in the furnace. When both materials are properly fused or melted, pressure is applied to the reducing agent in the vessel K by means of a compressed neutral gas—such, for instance, as hydrogen—the valves or cocks M being opened, and the sodium or other reducing agent is thereby forced in its molten state into the fused cryolite or other material at N and gradually rises through the fused material and quietly reduces the same, while the aluminium thus reduced gradually settles and combines at the bottom of the reducing-chamber, where it is drawn off through opening O.

In case sodium is to be reduced the sodium salt—such as caustic soda—is fused or melted in the reducing-chamber D, as above explained, and the process carried out as described in the reduction of aluminium, with this exception, that the molten reducing agent, which is preferably iron, is forced in near the top of the molten mass in small streams, and instead of drawing the metallic sodium off, as in the case of aluminium, it is allowed to distill and is condensed in a condensing-chamber connected with the walls of the furnace at the upper part of the reducing-chamber at or near the part marked X, Fig. 1, and when the soda becomes saturated or filled with oxide of iron it is drawn from this reducing-chamber through the tap-hole O and fresh soda supplied, while the oxide of iron is separated from the soda thus drawn by lixiviation, the liquor soda being evaporated and fused and the oxide of iron being reduced to its metallic state. Both are used over again in future operations.

It is obvious that in the reduction of metals, as above described, the same principle is carried out and applied in the case of each metal—namely, the reduction of a metal from a fused metallic salt or compound by means of a reducing agent in a fused, molten, or liquid state forced into or through the same, which is under pressure, substantially as set forth.

It is obvious that forcing a molten or liquid material to be reduced into a molten or liquid reducing agent, both being under pressure, will be substantially the same process as to force the reducing agent into the material to be reduced, as herein described.

Observing Fig. 3, the receptacles K and the reducing agent therein are subjected to heat from oxyhydrogen-jets $a\ a$, arranged beneath the receptacles, whereby the reducing agent employed is melted or fused, so that it can be forced through pipe L into reducing-chamber D on opening the valve M. The condenser X for condensing the sodium may be supported near the outside of the furnace, as shown in Fig. 3, and is provided with a pressure-valve H', which is so weighted that it will open at a less pressure than the pressure-valve H, so as to allow the gases to escape that are generated in chamber D during the process of reduction of the metal. The lower end of the condenser is provided with a discharge-pipe $b$ and valve $c$ for drawing off the condensed metal which has collected in the condenser from the reducing-chamber. The pressure-valve H acts as a governor to relieve the pressure in case the tube that connects the chamber D with the condenser should become clogged.

In cases where sodium or potassium are used as a reducing agent the heat arising from the furnace heats the receptacles K, Fig. 1, sufficiently to melt the contents, as these elements fuse at a temperature of about 200° Fahrenheit, so that it is unnecessary to place the same in brick-work. In cases where iron or other less fusible reducing agents are used the receptacle may be set within the walls of the furnace by placing it lower and heating it by carrying the flue $c$ around it, or by oxyhydrogen flame in any convenient manner, as shown in K, Fig. 3.

The vacuum and pressure valves I and H in the heads of the retorts or chambers D control the passage of air in said chambers, because the fused or melted material to be reduced which is in the chambers D is under pressure, the pressure being communicated from the fused or melted reducing agent in the retort or receptacle K through tube or pipe L, the valve M being open. The material in the retorts or chambers D being under pressure, it can readily be understood that the pressure will keep the vacuum-valve closed, so that no air can be admitted through it, and the air contained in said receptacle or chamber D above the fused salt cannot escape until the pressure exceeds that of the pressure-valve, so that no air is admitted into receptacle or chamber D while the reducing action is going on.

The object of the vacuum-valve is to allow the air to enter the receptacle or chamber D after the metal has been reduced and the pressure lessened, so that the air admitted can take the place of the metal or slag when they are drawn from the retort or chamber D through the tap-hole O. It is also obvious that alloys of sodium and potassium, which are naturally in a liquid state at ordinary temperatures, may be employed as a reducing agent in carrying out my process.

It is evident in the carrying out of my process that the only pressure required to be applied to the molten reducing agent in the receptacle K in cases where the reducing agent is of less specific gravity than the molten material to be reduced in the receptacle or chamber D is just enough to raise or open the pressure-valve H, when the lighter molten reducing agent will flow into the chamber D by its own gravity until the two materials stand at heights relative to their then-existing specific gravities in receptacle D and the tube connecting the same with receptacle K. The gas then being shut off by closing the valve M' expands in tube L and receptacle K by reason of the heat from the furnace and drives the remaining material in tube L into the receptacle D, at which time the valve M is closed to prevent the molten material from reascending tube L as the furnace cools and the gas contracts. In other words, pressure is only applied to the molten reducing agent in order to raise or open the pressure-valve, and thus equalize the pressure in both receptacles, the pressure being communicated to the material in receptacle D from the receptacle K through the tube L by means of the molten reducing agent contained therein.

What I claim as new, and desire to secure by Letters Patent, is—

1. The process for reducing metals, which consists in slowly introducing suitable reducing agents in a molten state into the molten material to be reduced, both the reducing agents and the material to be reduced being under pressure, by means of gravity and expansion of neutral gas, substantially as described.

2. The process for reducing metals, which consists in slowly introducing reducing agents in a liquid state into a molten metallic salt or combination by gravity and expansion of neutral gas, both materials being under super-atmospheric pressure, substantially as described.

In testimony whereof I have hereunto set my hand in the presence of two subscribing witnesses.

HENRY S. BLACKMORE.

Witnesses:
J. VAN SANTVOORD,
W. C. HAUFF.